(12) United States Patent
Jeong et al.

(10) Patent No.: US 11,025,094 B2
(45) Date of Patent: Jun. 1, 2021

(54) WIRELESS POWER RECEIVING DEVICE AND APPARATUS INCLUDING THE SAME

(71) Applicant: WITS Co., Ltd., Yongin-si (KR)

(72) Inventors: In Wha Jeong, Suwon-si (KR); Jae Suk Sung, Suwon-si (KR); Hugh Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 414 days.

(21) Appl. No.: 15/092,093

(22) Filed: Apr. 6, 2016

(65) Prior Publication Data

US 2016/0308395 A1 Oct. 20, 2016

(30) Foreign Application Priority Data

Apr. 16, 2015 (KR) .................. 10-2015-0054061
Jun. 15, 2015 (KR) .................. 10-2015-0084303

(51) Int. Cl.
*H02J 50/12* (2016.01)
*H02J 7/00* (2006.01)
*H02J 7/02* (2016.01)

(52) U.S. Cl.
CPC ............. *H02J 50/12* (2016.02); *H02J 7/025* (2013.01)

(58) Field of Classification Search
CPC .. H02J 50/12; H02J 7/025; H02J 50/10; H02J 50/50; H01F 38/14; H04B 5/0037; H04B 5/0081; H04B 5/00
USPC ....................................................... 307/104
See application file for complete search history.

(56) References Cited

U.S. PATENT DOCUMENTS

| 2012/0092222 | A1* | 4/2012 | Kato .................. H01Q 21/0025 343/742 |
| 2014/0327390 | A1 | 11/2014 | Park et al. |
| 2015/0023079 | A1 | 1/2015 | Sawada et al. |
| 2015/0115727 | A1* | 4/2015 | Carobolante .......... H02J 50/40 307/104 |
| 2016/0204619 | A1* | 7/2016 | Lin ........................ H01F 38/14 307/104 |
| 2018/0083487 | A1* | 3/2018 | Nalbant .................. H02J 7/025 |

FOREIGN PATENT DOCUMENTS

| CN | 103337914 A | 10/2013 |
| CN | 103580300 A | 2/2014 |
| CN | 104054229 A | 9/2014 |

(Continued)

OTHER PUBLICATIONS

Chinese Office Action dated Sep. 23, 2019 issued in corresponding Chinese Application No. 201610236718.X.

(Continued)

*Primary Examiner* — Rexford N Barnie
*Assistant Examiner* — Swarna N Chowdhuri
(74) *Attorney, Agent, or Firm* — Harness, Dickey & Pierce, P.L.C.

(57) ABSTRACT

A wireless power receiving device includes a first resonance circuit configured to have a first resonance frequency; a second resonance circuit configured to have a second resonance frequency lower than the first resonance frequency; and a rectifying circuit connected to the first resonance circuit and the second resonance circuit without a switch and configured to rectify power received through the first resonance circuit and the second resonance circuit.

12 Claims, 13 Drawing Sheets

(56) References Cited

FOREIGN PATENT DOCUMENTS

| | | |
|---|---|---|
| CN | 104081623 A | 10/2014 |
| EP | 2 660 944 A1 | 11/2013 |
| JP | 2006-72966 A | 3/2006 |
| KR | 10-2013-0093667 A | 8/2013 |
| KR | 10-2014-0131428 A | 11/2014 |

OTHER PUBLICATIONS

Chinese Office Action dated May 21, 2020 issued in corresponding Chinese Patent Application No. 201610236718.X.

* cited by examiner

WIRELESS POWER RECEIVING DEVICE AND APPARATUS INCLUDING THE SAME

CROSS-REFERENCE TO RELATED APPLICATION

This application claims the benefit of Korean Patent Application No. 10-2015-0054061 filed on Apr. 16, 2015 and Korean Patent Application No. 10-2015-0084303 filed on Jun. 15, 2015 in the Korean Intellectual Property Office, the disclosure of which is incorporated herein by reference for all purposes.

BACKGROUND

1. Field

The following description relates to a wireless power receiving device to which wireless power transfer technology is applied and an apparatus including the wireless power receiving device.

2. Description of Related Art

Wireless power transfer technology is widely applied to a field of chargers of various communications devices such as smartphones and various home appliances, and in the future will have wide range of fields of utilization, such as charging electric vehicles, etc. . . .

Wireless power transfer technology has been developed in a variety methods and uses different frequencies according to each method. For example, a magnetic induction method in light of the Wireless Power Consortium (WPC) standard uses a frequency from 110 kHz-205 kHz, and another magnetic resonance method in light of the Alliance for Wireless Power (A4WP) standard uses a frequency of 6.78 MHz.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless power receiving device includes a first resonance circuit configured to have a first resonance frequency; a second resonance circuit configured to have a second resonance frequency lower than the first resonance frequency; and a rectifying circuit connected to the first resonance circuit and the second resonance circuit without a switch and configured to rectify power received through the first resonance circuit and the second resonance circuit.

The rectifying circuit may include a first bridge, a second bridge, and a third bridge, wherein the first bridge and the third bridge may be configured to rectify the power received through the first resonance circuit, and wherein the second bridge and the third bridge may be configured to rectify the power received through the second resonance circuit.

The first resonance frequency may be more than about 5 times the second resonance frequency.

The first resonance circuit may include a first coil section and a first capacitor; and the second resonance circuit may include the first coil section, a second coil section, and a second capacitor.

The rectifying circuit may include a first bridge connected to the first capacitor without a switch; a second bridge connected to the second capacitor without a switch; and a third bridge connected to the first coil section without a switch.

Inductance of the second coil section may be more than about 4 times the inductance of the first coil section.

Capacitance of the second capacitor may be more than about 5 times the capacitance of the first capacitor.

The rectifying circuit may include a first bridge connected to the first capacitor and the second capacitor without a switch; and a second bridge connected to the first coil section without a switch.

The wireless power receiving device may include one power receiving coil, and each of the first coil section and the second coil section may be a part of the power receiving coil.

The first capacitor may be connected between an intermediate node disposed between one end and the other end of the power receiving coil and the rectifying circuit, the second capacitor may be connected between the one end of the power receiving coil and the rectifying circuit, and the other end of the power receiving coil may be connected to the rectifying circuit.

The first coil section may be a first coil disposed on a first surface of a substrate, and the second coil section may be a second coil disposed on a second surface facing the first surface of the substrate.

One end of the first coil and one end of the second coil may be connected to each other, the first capacitor may be connected between the one end of the first coil and the rectifying circuit; the second capacitor may be connected between the other end of the second coil and the rectifying circuit; and the other end of the first coil may be connected to the rectifying circuit.

The first coil section may be a first coil disposed on a first surface of a substrate, and the second coil section may be a second coil disposed on the first surface of the substrate and spaced apart from the first coil.

One end of the first coil and one end of the second coil may be connected to each other; the first capacitor may be connected between the one end of the first coil and the rectifying circuit; the second capacitor may be connected between the other end of the second coil and the rectifying circuit; and the other end of the first coil may be connected to the rectifying circuit.

According to another general aspect, an electronic apparatus includes a wireless power receiving device including a first resonance circuit having a first resonance frequency, a second resonance circuit having a second resonance frequency lower than the first resonance frequency, and a rectifying circuit connected to the first resonance circuit and the second resonance circuit without a switch, the rectifying circuit configured to rectify power received through the first resonance circuit or the second resonance circuit, and output charging power; and a charger configured to be charged by the charging power received from the rectifying circuit.

According to another general aspect, a wireless power receiving apparatus includes a substrate; a rectifier; a receiving coil disposed on the substrate, the receiving coil comprising: a shared coil portion configured to have a first resonance frequency; and, an extended coil portion configured collectively with the shared coil portion to have a second resonance frequency lower than the first resonance frequency, the shared coil portion and the extended coil portion being fixedly coupled to the rectifier for selective actuation according to a received wireless power.

The extended coil portion may be configured collectively with the shared coil portion to establish the second resonance frequency about 4 times to about 20 times lower than the first resonance frequency.

The shared coil portion may be configured to receive an Alliance For Wireless Power (A4WP) wireless charging standard.

The extended coil portion may be collectively configured with the shared coil portion to receive a Wireless Power Consortium (WPC) or a Power Matters Alliance (PMA) wireless power standard.

Other features and aspects will be apparent from the following detailed description, the drawings, and the claims.

BRIEF DESCRIPTION OF THE DRAWINGS

The above and other aspects, features, and advantages in the present disclosure will be more clearly understood from the following detailed description taken in conjunction with the accompanying drawings, in which.

DETAILED DESCRIPTION

Figure 1:
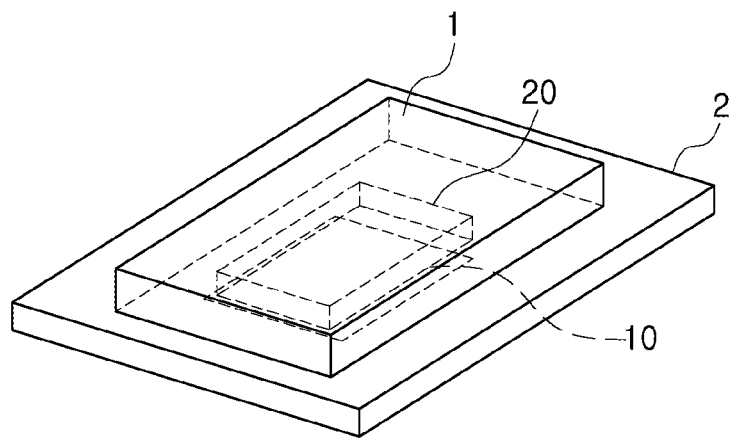
FIG. 1 is a schematic diagram of a wireless power charging system including an apparatus which includes a wireless power receiving device and a wireless power transmitting device according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a wireless power receiving device and an apparatus including the wireless power receiving device according to example embodiments will be described in detail with reference to the accompanying drawings.

In the drawings, the same reference numerals will be used throughout to designate the same or like elements.

FIG. 1 is a schematic diagram of a wireless power charging system including an apparatus 1 including a wireless power receiving device 10 and a wireless power transmitting device 2 according to an example embodiment. The wireless power charging system may include the apparatus 1 including the wireless power receiving device 10, a battery 20, and the wireless power transmitting device 2.

The wireless power transmitting device 2 wirelessly transmits power.

The wireless power receiving device 10 receives power wirelessly transmitted by the wireless power transmitting device 2 and outputs charging power. The wireless power receiving device 10 may be separated from the apparatus 1. Alternatively, all or a part of elements of the wireless power receiving device 10 may be implemented by being coupled to a case of the apparatus 1 or a main body thereof. A detailed configuration of the wireless power receiving device 10 will be described later.

The battery 20 stores energy by using charging power which is output by the wireless power receiving device 10.

The apparatus 1 performs various operations by using the energy stored in the battery 20. For example, the apparatus 1 may include a display device (not shown) that receives power from the battery 20 to display various types of information, or may include a communications module (not shown), a microphone (not shown), or a speaker (not shown) that receives power from the battery 20 to perform mobile communications functions.

Figure 2:
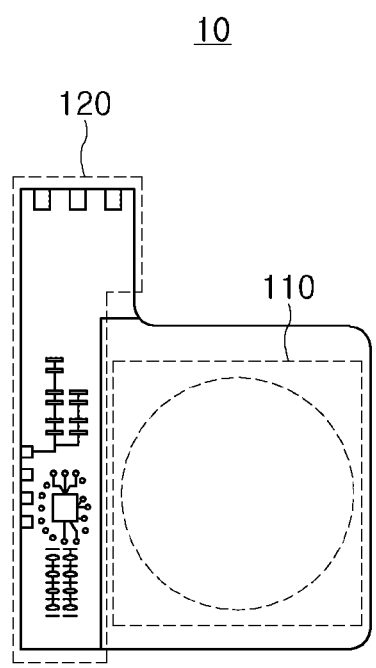
FIG. 2 is a schematic diagram of a wireless power receiving device according to an example embodiment.

FIG. 2 is a schematic diagram of the wireless power receiving device 10 according to an example embodiment. The wireless power receiving device 10, according to an example embodiment, may take on a form of a substrate including a coil region 110 and a circuit region 120.

One or more power receiving coils may be disposed in the coil region 110.

A rectifying circuit including a plurality of bridges may be disposed in the region 110.

Capacitors may be disposed in the coil region 110 or in the circuit region 120. When the capacitors are disposed in the coil region 110, the capacitors may be implemented by being embedded in a substrate.

The substrate may be a printed circuit board (PCB), a flexible printed circuit board (FPCB), and a circuit substrate of other various forms.

Although the wireless power receiving device 10 is in the form of the substrate including the coil region 110 and the circuit region 120 in FIG. 2, circuits disposed in the circuit region 120 may be disposed in other regions of the apparatus (1 of FIG. 1). In this case, the substrate may be a coil module including only the coil region 110. The coil module may be implemented separately from the apparatus (1 of FIG. 1) or integrally with a case of the apparatus (1 of FIG. 1).

Figure 3:
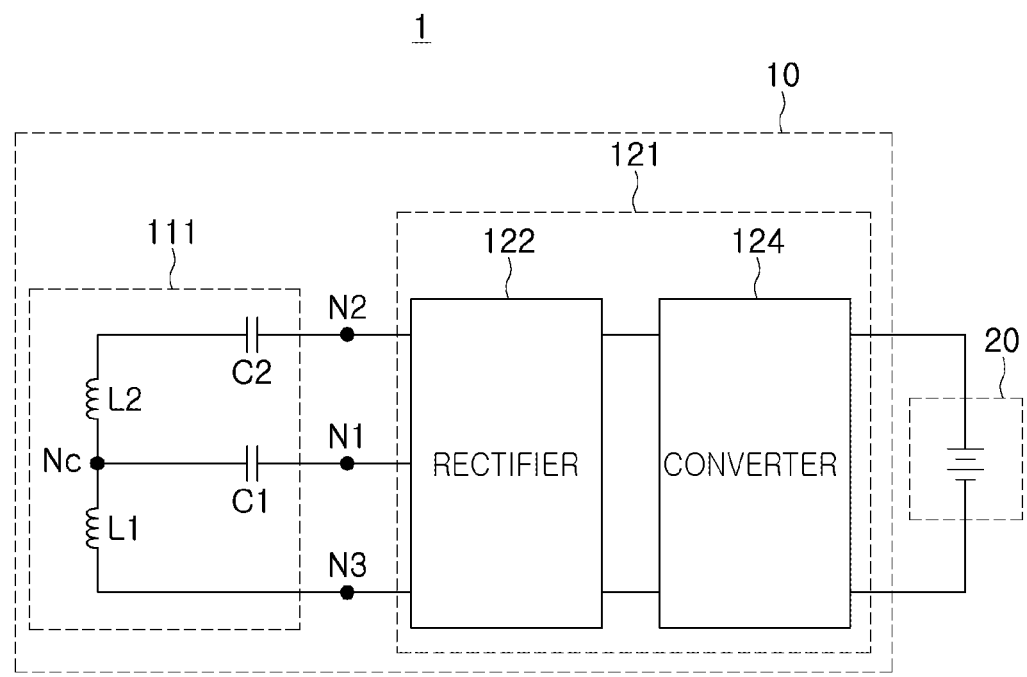
FIG. 3 is a schematic block diagram of a configuration of an apparatus including a wireless power receiving device according to an example embodiment.

FIG. 3 is a schematic block diagram of a configuration of the apparatus 1 including the wireless power receiving device 10 according to an example embodiment. The apparatus 1 according to an example embodiment includes the wireless power receiving device 10 and the battery 20. The wireless power receiving device 10 according to an example embodiment includes a coil circuit 111 and a rectifying circuit 121. The rectifying circuit 121 may include a rectifier 122 and a converter 124.

The coil circuit 111 may receive various power having different frequencies. The coil circuit 111 includes first resonance circuits L1 and C1 having a first resonance frequency and a second resonance circuits L1, L2, and C2 having a second resonance frequency lower than the first resonance frequency. The first resonance circuits L1 and C1 include the first coil section L1 and the first capacitor C1. The second resonance circuits L1, L2, and C2 include the first coil section L1, the second coil section L2, and the second capacitor C2. That is, the first resonance circuits L1 and C1 and the second resonance circuits L1, L2, and C2 may share the first coil section L1. Values of the first coil section L1, the first capacitor C1, the second coil section L2, and the second capacitor C2 may be set in such a manner that the first resonance circuits L1 and C1 have the first resonance frequency, and the second resonance circuits L1, L2, and C2 have the second resonance frequency.

The first resonance circuits L1 and C1 may receive wireless power having a first frequency corresponding to the first resonance frequency. The second resonance circuits L1, L2, and C2 may receive wireless power having a second frequency corresponding to the second resonance frequency. That is, if the wireless power having the first frequency is transmitted, the wireless power may be received through the first resonance circuits L1 and C1, and if the wireless power having the second frequency is received, the wireless power may be received through the second resonance circuits L1, L2, and C2.

The first resonance circuits L1 and C1 and the second resonance circuits L1, L2, and C2 may be connected to the rectifying circuit 121 without a switch. That is, the first resonance circuits L1 and C1 and the second resonance circuits L1, L2, and C2 may maintain an electrical connection to the rectifying circuit 121.

The first coil section L1 is connected between a third node N3 and an intermediate node Nc. The first capacitor C1 is connected between the intermediate node Nc and a first node N1. The second coil section L2 is connected to the intermediate node Nc. The second capacitor C2 is connected between the second coil section L2 and a second node N2. The first node N1, the second node N2, and the third node N3 may maintain an electrical connection to the rectifier 122.

The first coil section L1 and the second coil section L2 of FIG. 3 may be sections of one coil or may be of separate coils.

The rectifying circuit 121 may rectify the wireless power received by the coil circuit 111, convert the rectified wireless power into a charging power having a magnitude suitable for charging the battery 20, and output the charging power.

The rectifier 122 may rectify the wireless power received by the coil circuit 111. The wireless power having the first frequency may be input into the rectifier 122 through the first node N1 and the third node N3. The wireless power having the second frequency may be input into the rectifier 122 through the second node N2 and the third node N3. The rectifier 122 may maintain an electrical connection to the first node N1, the second node N2, and the third node N3, and may rectify and output the wireless power having the first frequency or the wireless power having the second frequency.

The converter 124 may convert the power rectified and output by the rectifier 122 into the charging power having the magnitude suitable for charging the battery 20 and output the charging power. The converter 124 may be a DC-DC converter. In some cases, the converter 124 may be omitted.

Figure 4:
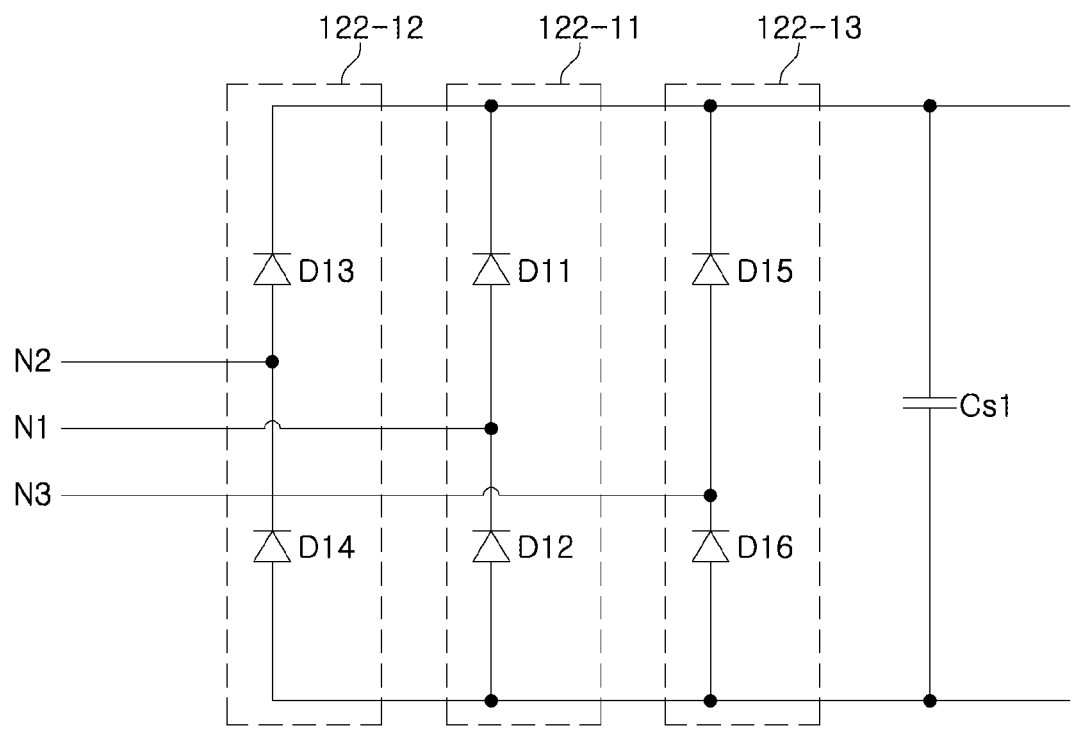
FIG. 4 is a diagram of an example of a rectifier of a wireless power receiving device according to an example embodiment.

FIG. 4 is a diagram of an example of a rectifier 122-1 of a wireless power receiving device according to an example embodiment. The rectifier 122-1 includes a first bridge 122-11, a second bridge 122-12, a third bridge 122-13, and a smoothing capacitor Cs1.

The first bridge 122-11 includes a first diode D11 and a second diode D12. A node connected to the first diode D11 and the second diode D12 may be connected to the first node N1.

The second bridge 122-12 includes a third diode D13 and a fourth diode D14. A node connected to the third diode D13 and the fourth diode D14 may be connected to the second node N2.

The third bridge 122-13 includes a fifth diode D15 and a sixth diode D16. A node connected to the fifth diode D15 and the sixth diode D16 may be connected to the third node N3.

As described with reference to FIG. 3, the first node N1, the second node N2, and the third node N3 may be nodes connected to ends of a first resonance circuit and a second resonance circuit of the coil circuit (111 of FIG. 3). In more detail, the first node N1 may be a node connected to one end of the first capacitor C1 of the first resonance circuit, the second node N2 may be a node connected to one end of the second capacitor C2 of the second resonance circuit, and the third node N3 may be a node connected to one end of the first coil section L1 that is shared by the first resonance circuit and the second resonance circuit.

The first bridge 122-11, the second bridge 122-12, and the third bridge 122-13 are connected in parallel to each other.

The smoothing capacitor Cs1 is connected in parallel to the first bridge 122-11, the second bridge 122-12, and the third bridge 122-13, and may smooth wireless power rectified through the first bridge 122-11 and the third bridge 122-13, or the second bridge 122-12 and the third bridge 122-13. In some cases, the smoothing capacitor Cs1 may be omitted.

Figure 5:
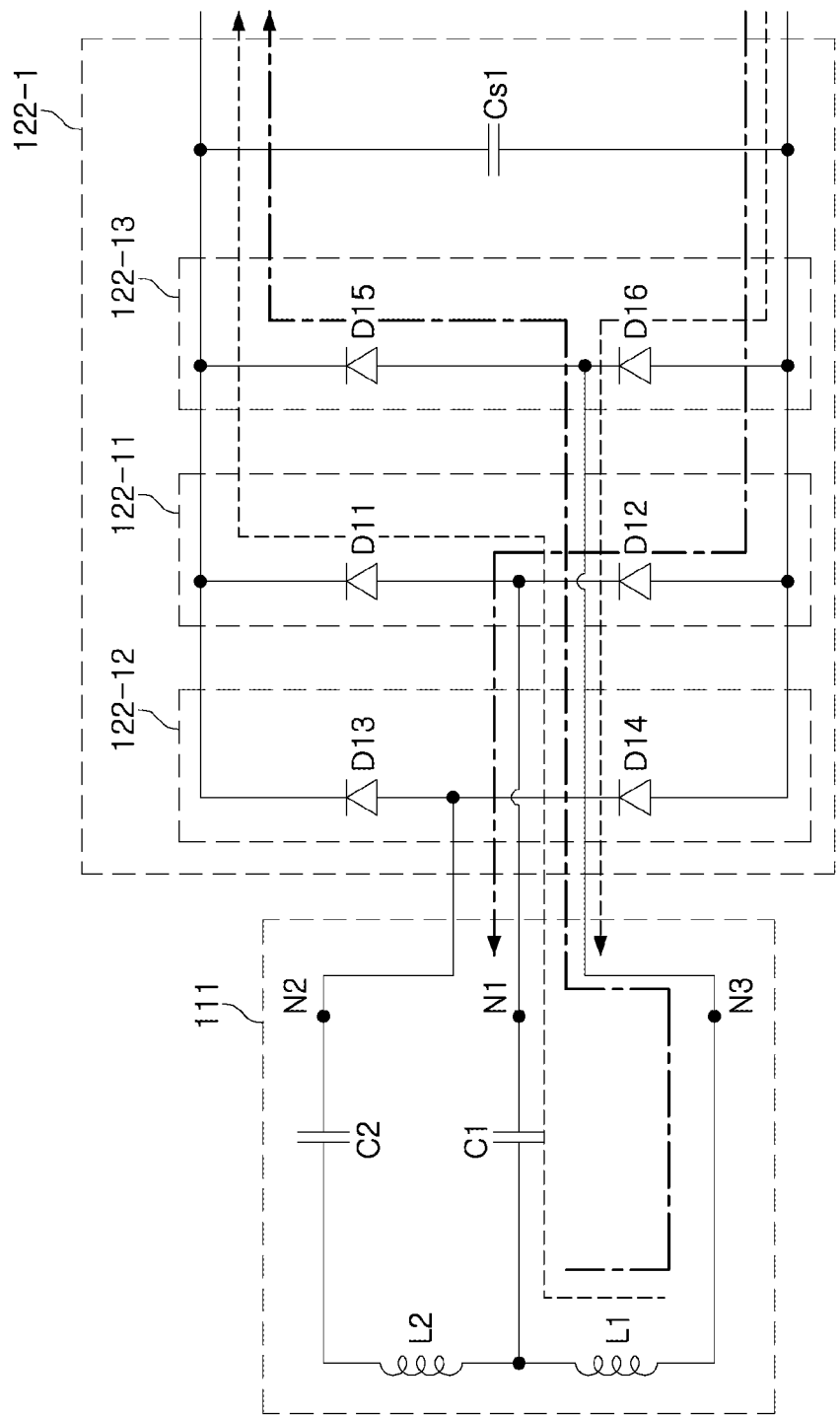
FIGS. 5 and 6 are diagrams showing an operation of the example of the rectifier of FIG. 4.
Figure 6:
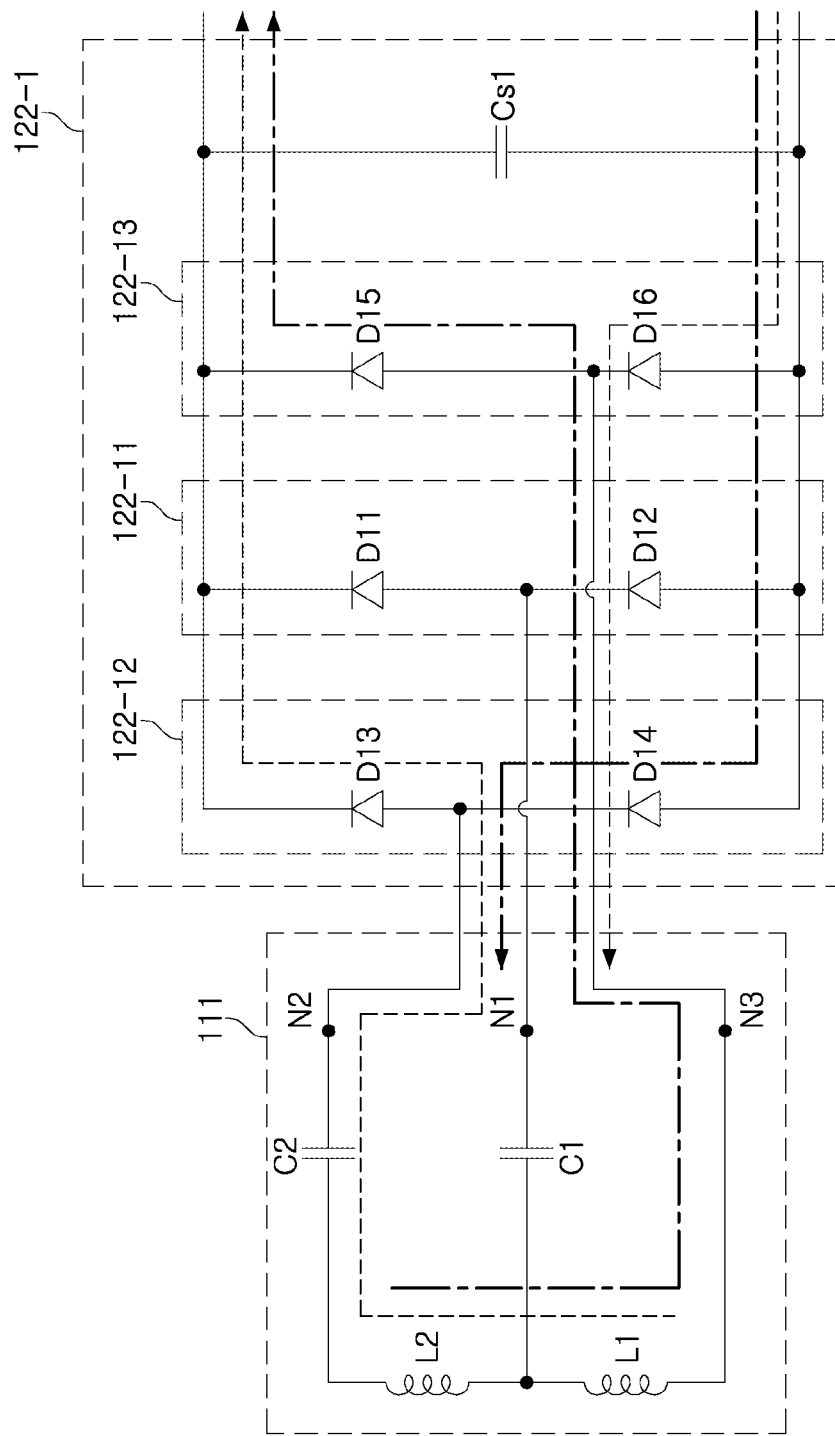

FIG. 5 is a diagram showing an operation of the example of the rectifier 122-1 of FIG. 4 when the wireless power having the first frequency is received. FIG. 6 is a diagram showing an operation of the example of the rectifier 122-1 of FIG. 4 when the wireless power having the second frequency lower than the first frequency is received. In this regard, the first frequency may be a frequency corresponding to a resonance frequency (first resonance frequency) of the first resonance circuits L1 and C1 and have the same value as the first resonance frequency $$\left(\frac{1}{\sqrt{L1 \cdot C1}}\right),$$

and the second frequency may be a frequency corresponding to a resonance frequency (second resonance frequency) of the second resonance circuits L1, L2, and C2 and have the same value as the second resonance frequency $$\left(\frac{1}{\sqrt{(L1+L2) \cdot C2}}\right).$$

Hereinafter, for clarity and conciseness, an assumption that when the received wireless power has a positive value, current that flows through the first coil section L1 and/or the second coil section L2 flows from the third node N3 to the first node N1 or the second node N2, and when the received wireless power has a negative value, the current that flows through the first coil section L1 and/or the second coil section L2 flows from the first node N1 or the second node N2 to the third node N3, the operation of the rectifying circuit of the wireless power receiving device according to an example embodiment will be described.

First, a case where the wireless power having the first frequency is received will now be described with reference to FIG. 5. In FIG. 5, a broken line indicates a flow of the current when the wireless power has the positive value, and an alternated long and short dash line indicates the flow of the current when the wireless power has the negative value.

When the wireless power having the first frequency has the positive value, a voltage of the first node N1 connected to the first resonance circuits L1 and C1 having the first resonance frequency may be higher than a voltage of the second node N2 connected to the second resonance circuits L1, L2, and C2 having the second resonance frequency. If the first diode D11 is turned on since the voltage of the first node N1 is increased, a reverse voltage may be applied to the third diode D13, and thus the third diode D13 maintains an off status. A voltage of the third node N3 is relatively low, and thus the sixth diode D16 may be turned on.

When the wireless power having the first frequency has the negative value, the voltage of the first node N1 connected to the first resonance circuits L1 and C1 having the first resonance frequency may be lower than the voltage of the second node N2 connected to the second resonance circuits L1, L2, and C2 having the second resonance frequency. If the second diode D12 is turned on since the voltage of the first node N1 is reduced, the reverse voltage may be applied to the fourth diode D14, and thus the fourth diode D14 maintains an off status. The voltage of the third node N3 is relatively high, and thus the fifth diode D15 may be turned on.

That is, the wireless power having the first frequency may be input into the rectifier 122-1 through the first node N1 and the third node N3. Thus, the wireless power received through the first bridge 122-11 and the third bridge 122-13 of the rectifier 122-1 may be rectified. The third diode D13 and the fourth diode D14 that constitute the second bridge 122-12 maintain the off status, and thus the second coil section L2 and the second capacitor C2 may have no influence on a circuit. That is, the coil circuit 111 may operate in the same manner as one resonance circuit having the first resonance frequency $$\left(\frac{1}{\sqrt{L1 \cdot C1}}\right).$$

Next, a case in which the wireless power having the second frequency is received will now be described with reference to FIG. 6. In FIG. 6, a broken line indicates the flow of the current when the wireless power has the positive value, and an alternated long and short dash line indicates the flow of the current when the wireless power has the negative value.

When the wireless power having the second frequency has the positive value, a voltage of the second node N2 connected to the second resonance circuits L1, L2, and C2 having the second resonance frequency may be higher than a voltage of the first node N1 connected to the first resonance circuits L1 and C1 having the first resonance frequency. If the third diode D13 is turned on since the voltage of the second node N2 is increased, a reverse voltage may be applied to the first diode D11, and thus the first diode D11 maintains an off status. A voltage of the third node N3 is relatively low, and thus the sixth diode D16 may be turned on.

When the wireless power having the second frequency has the negative value, the voltage of the second node N2 connected to the second resonance circuits L1, L2, and C2 having the second resonance frequency may be lower than the voltage of the first node N1 connected to the first resonance circuits L1 and C1 having the first resonance frequency. If the fourth diode D14 is turned on since the voltage of the second node N2 is reduced, the reverse voltage may be applied to the second diode D12, and thus the second diode D12 maintains an off status. The voltage of the third node N3 is relatively high, and thus the fifth diode D15 may be turned on.

That is, the wireless power having the second frequency may be input into the rectifier 122-1 through the second node N2 and the third node N3. Thus, the wireless power received through the second bridge 122-12 and the third bridge 122-13 of the rectifier 122-1 may be rectified. The first diode D11 and the second diode D12 that constitute the first bridge 122-11 maintain the off status, and thus the first capacitor C1 may have no influence on a circuit. That is, the coil circuit 111 may operate in the same manner as one resonance circuit having the second resonance frequency $$\left(\frac{1}{\sqrt{(L1 + L2) \cdot C2}}\right).$$

In the embodiments of FIGS. 4 through 6, the first frequency may be a frequency, for example, of the Alliance for Wireless Power (A4WP) standard, and the second frequency may be a frequency, for example, of the Wireless Power Consortium (WPC) standard or the Power Matters Alliance (PMA) standard. In this case, inductance of each of the first coil section L1 and the second coil section L2 and capacitance of each of the first capacitor C1 and the second capacitor C2 may be determined in such a manner that the first resonance frequency $$\left(\frac{1}{\sqrt{L1 \cdot C1}}\right)$$

is the frequency of the Alliance for Wireless Power (A4WP) standard, and the second resonance frequency $$\left(\frac{1}{\sqrt{(L1 + L2) \cdot C2}}\right)$$

is the frequency of the Wireless Power Consortium (WPC) standard or the Power Matters Alliance (PMA) standard.

Alternatively, in the embodiments of FIGS. 4 through 6, the first frequency may be the frequency of the Power Matters Alliance (PMA) standard, and the second frequency may be the frequency of the Wireless Power Consortium (WPC) standard. In this case, the inductance of each of the first coil section L1 and the second coil section L2 and the capacitance of each of the first capacitor C1 and the second capacitor C2 may be determined in such a manner that the first resonance frequency $$\left(\frac{1}{\sqrt{L1 \cdot C1}}\right)$$

is the frequency of the Power Matters Alliance (PMA) standard, and the second resonance frequency $$\left(\frac{1}{\sqrt{(L1+L2) \cdot C2}}\right)$$

is the frequency of the Wireless Power Consortium (WPC) standard.

Capacitance of the smoothing capacitor Cs1 may be set to have a sufficiently greater value than capacitance of the first capacitor C1 and the second capacitor C2.

The frequency of the WPC standard may be in the range of, for example about 110 kHz to about 205 kHz. The frequency of the PMA standard may be, for example, in the range of about 277 kHz to about 357 kHz. The frequency of the A4WP standard may be approximately 6.78 MHz.

Figure 7:
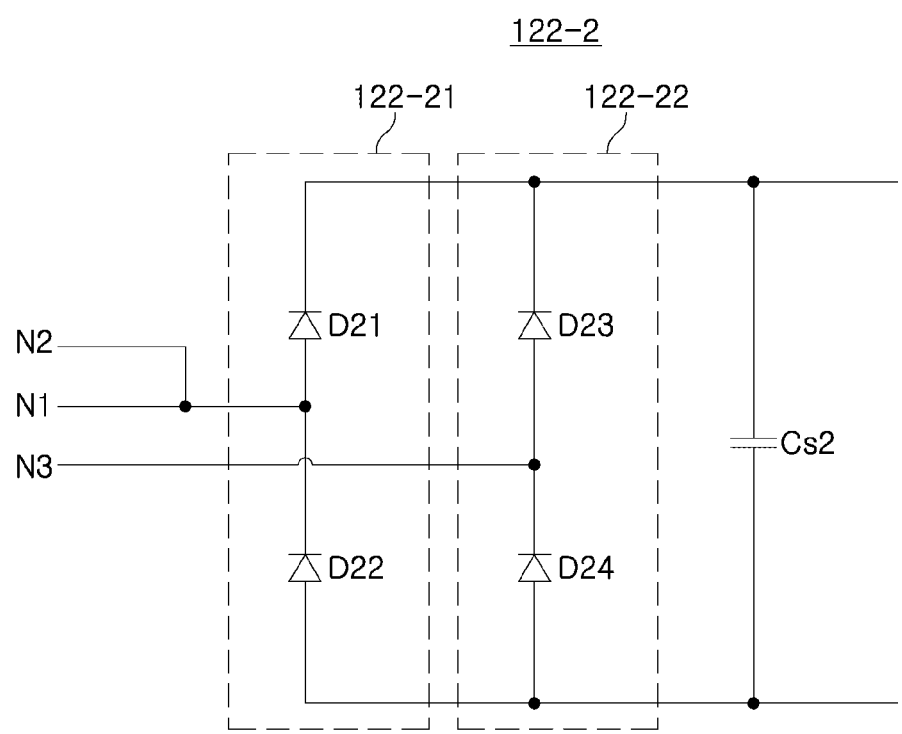
FIG. 7 is a diagram of another example of a rectifier of a wireless power receiving device according to an example embodiment.

FIG. 7 is a diagram of another example of a rectifier 122-2 of a wireless power receiving device according to an example embodiment. The rectifier 122-2 includes a first bridge 122-21, a second bridge 122-22, and a smoothing capacitor Cs2.

The first bridge 122-21 includes a first diode D21 and a second diode D22. A node connected to the first diode D21 and the second diode D22 may be connected to the first node N1 and the second node N2.

The second bridge 122-22 may include a third diode D23 and a fourth diode D24. A node connected to the third diode D23 and the fourth diode D24 may be connected to the third node N3.

As described with reference to FIG. 3, the first node N1, the second node N2, and the third node N3 are nodes connected to ends of a first resonance circuit and second resonance circuit of the coil circuit (111 of FIG. 3). In more detail, the first node N1 is connected to one end of the first capacitor C1 of the first resonance circuit, the second node N2 is connected to one end of the second capacitor C2 of the second resonance circuit, and the third node N3 is connected to one end of the first coil section L1 that is shared by the first resonance circuit and the second resonance circuit.

The first bridge 122-21 and the second bridge 122-22 are connected in parallel to each other.

The smoothing capacitor Cs2 is connected in parallel to the first bridge 122-21 and the second bridge 122-22, and may smooth and output wireless power rectified through the first bridge 122-21 and the second bridge 122-22. In some cases, the smoothing capacitor Cs2 may be omitted.

If the first resonance frequency $$\left(\frac{1}{\sqrt{L1 \cdot C1}}\right)$$

is about 5 times the second resonance frequency $$\left(\frac{1}{\sqrt{(L1+L2) \cdot C2}}\right),$$

coupling or interference may be reduced between a power transmission coil that transmits wireless power having a first frequency corresponding to the first resonance frequency and the second resonance circuits (L1, L2, and C2 of FIG. 3). Likewise, coupling or interference may be reduced between a power transmission coil that transmits wireless power having a second frequency corresponding to the second resonance frequency and the first resonance circuits (L1 and C1 of FIG. 3). Thus, according to an example embodiment, inductance of each of the first coil section L1 and the second coil section L2 and capacitance of each of the first capacitor C1 and the second capacitor C2 may be determined in such a manner that the first resonance frequency $$\left(\frac{1}{\sqrt{L1 \cdot C1}}\right)$$

is more than about 5 times the second resonance frequency $$\left(\frac{1}{\sqrt{(L1+L2) \cdot C2}}\right).$$

The inductance of the second coil section L2 may be more than about 4 times the inductance of the first coil section L1. In this case, the capacitance of the second capacitor C2 may be more than about 5 times the capacitance of the first capacitor C1.

In an example embodiment, the first resonance frequency $$\left(\frac{1}{\sqrt{L1 \cdot C1}}\right)$$

may be a frequency of the Alliance for Wireless Power (A4WP) standard, and the second resonance frequency $$\left(\frac{1}{\sqrt{(L1+L2) \cdot C2}}\right)$$

may be a frequency of the Wireless Power Consortium (WPC) standard or the Power Matters Alliance (PMA) standard. The frequency of the WPC standard may be in the range of about 110 kHz to about 205 kHz. The frequency of the PMA standard may be in the range of about 277 kHz to about 357 kHz. The frequency of the A4WP standard may be about 6.78 MHz.

Figure 8:
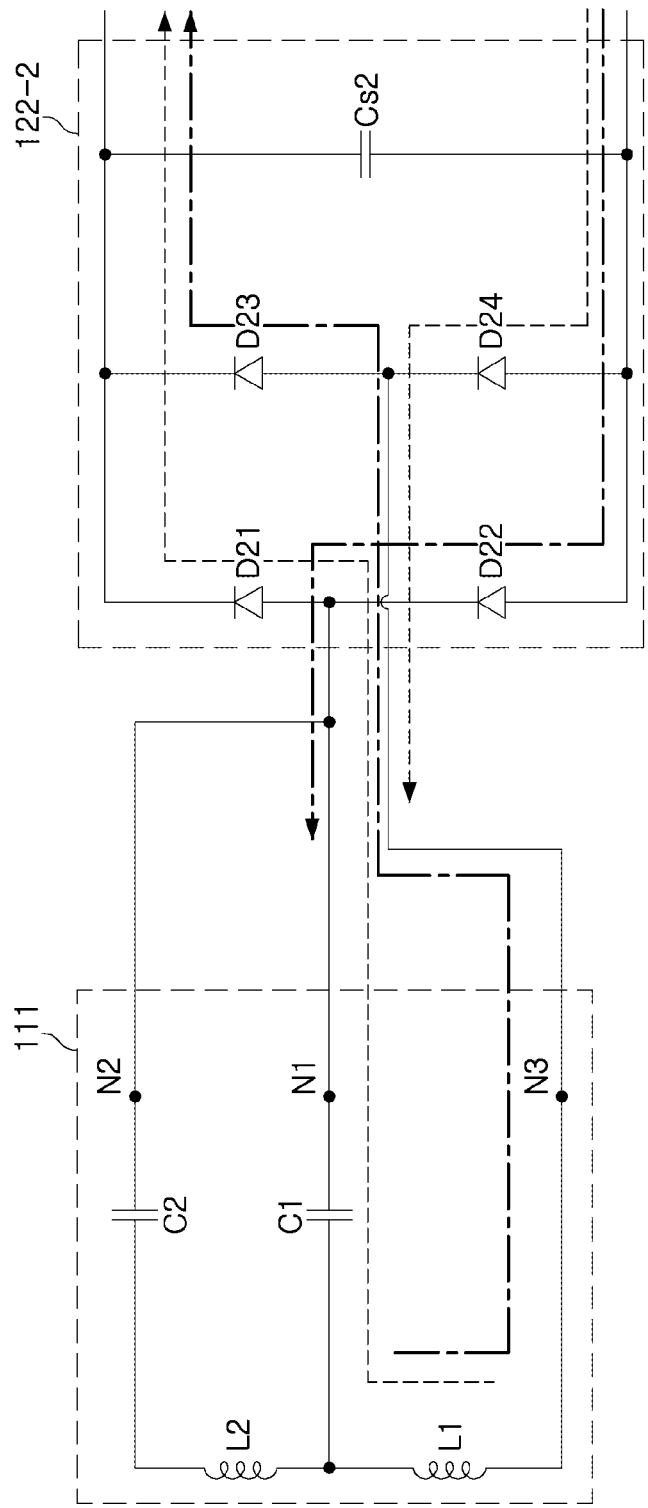
FIGS. 8 and 9 are diagrams showing an operation of the example of the rectifier of FIG. 7.

FIG. 8 is a diagram showing an operation of the example of the rectifier 122-2 of FIG. 7 when wireless power having a first frequency f1 is received. The first frequency f1 may correspond to the first resonance frequency $$\left(\frac{1}{\sqrt{L1 \cdot C1}}\right).$$

For example, the value of the first frequency f1 may be the same as the value of the first resonance frequency.

In the first frequency f1, the impedance of the second coil section L2 ($2\pi \cdot f1 \cdot L2$) may be sufficiently greater than the impedance of the second capacitor C2

$$\left(\frac{1}{2\pi \cdot f1 \cdot C2}\right)$$

so that the second coil section L2 and the second capacitor C2 may be about the same as an equivalent existence of only the second coil section L2.

In the first frequency f1, the impedance of the first capacitor C1

$$\left(\frac{1}{2\pi \cdot f1 \cdot C1}\right)$$

may be almost the same as the impedance of the first coil section L1 ($2\pi \cdot F1 \cdot L1$), and thus the impedance of the second coil section L2 ($2\pi \cdot F1 \cdot L2$) may be sufficiently greater than the impedance of the first capacitor C1

$$\left(\frac{1}{2\pi \cdot f1 \cdot C1}\right),$$

so that the second coil section L2 may be about the same as being opened in a circuit.

Therefore, when the wireless power has the first frequency f1 corresponding to the first resonance frequency $$\left(\frac{1}{\sqrt{L1 \cdot C1}}\right),$$

the coil circuit 111 may be about the same state as an existence of only the first coil section L1 and the first capacitor C1. That is, the wireless power having the first frequency f1 may be transferred to the rectifier 122-2 through the first node N1 and the third node N3, and the rectifier 122-2 may rectify the wireless power having the first frequency f1.

Figure 9:
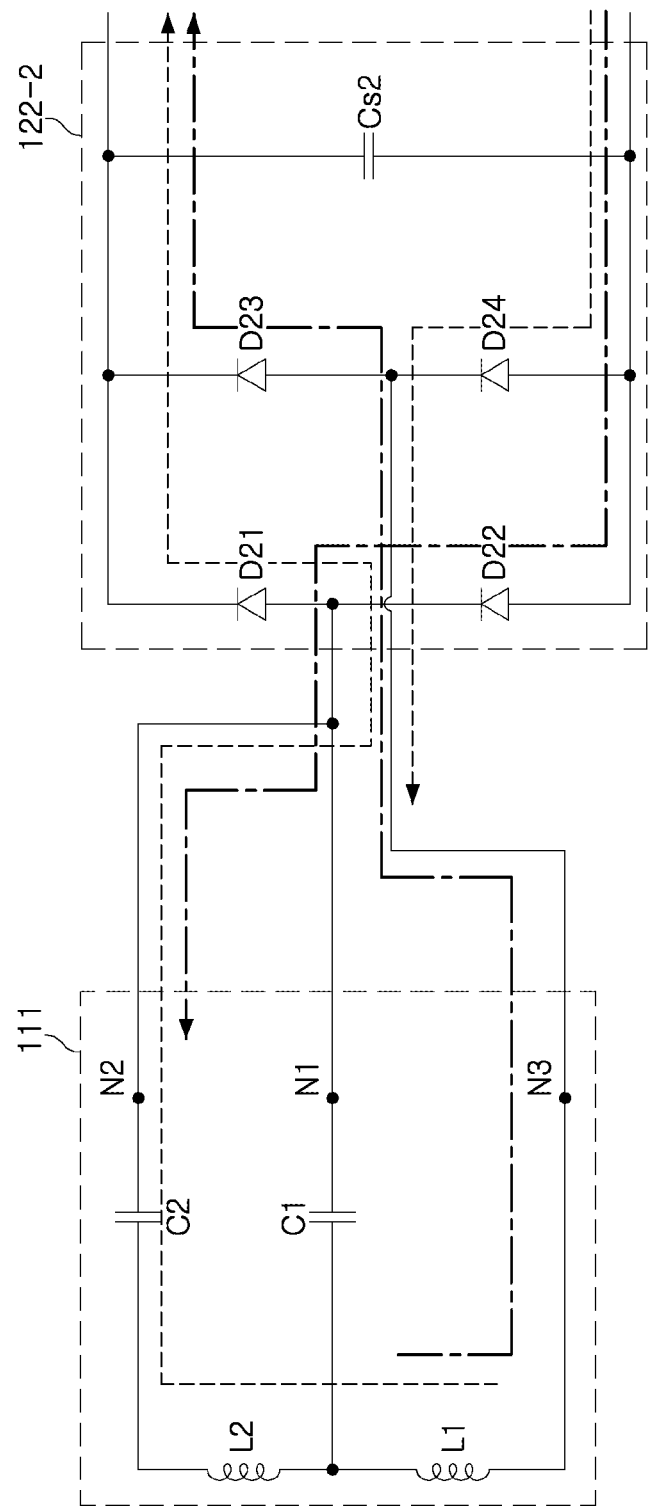

FIG. 9 is a diagram showing an operation of the example of the rectifier 122-2 of FIG. 7 when wireless power having a second frequency f2 is received. The second frequency f2 may correspond to the second resonance frequency $$\left(\frac{1}{\sqrt{(L1 + L2) \cdot C2}}\right).$$

For example, the value of the second frequency f2 may be the same as the value of the second resonance frequency.

In the second frequency f2, the impedance of the first capacitor C1

$$\left(\frac{1}{2\pi \cdot f2 \cdot C1}\right)$$

may be sufficiently greater than the impedance of the first coil section L1 (($2\pi \cdot F1 \cdot L1$). The impedance of the first coil section L1, the second coil section L2 and the second capacitor C2

$$\left(2\pi \cdot f2 \cdot (L1 + L2) - \frac{1}{2\pi \cdot f2 \cdot C2}\right)$$

may have a very small value.

Therefore, when the wireless power has the second frequency f2, the first capacitor C1 may be in the same state as being opened, and may be regarded as having almost no influence on a circuit, and the coil circuit 111 may be the same state as an existence of only the first coil section L1, the second coil section L2, and the second capacitor C2. That is, the wireless power having the second frequency f2 may be transferred to the rectifier 122-2 through the second node N2 and the third node N3, and the rectifier 122-2 may rectify the wireless power having the second frequency f2.

Figure 10:
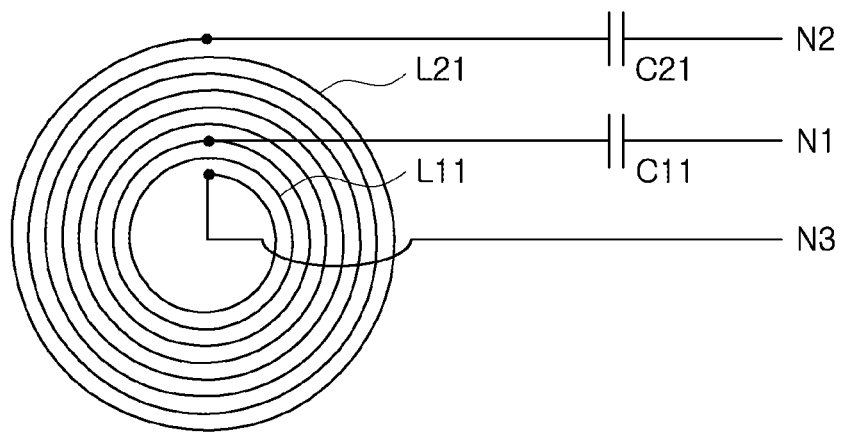
FIGS. 10 through 21 are diagrams of coil circuits of a wireless power receiving device according to an example embodiment.
Figure 11:
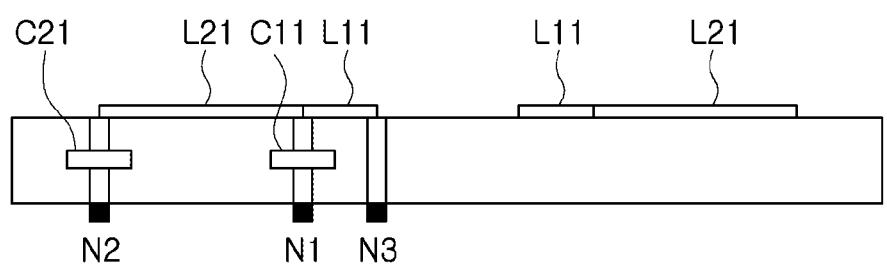

FIG. 10 is a diagram of a coil circuit 10-1 of a wireless power receiving device according to an example embodiment. FIG. 11 is a cross-sectional view of a coil circuit 110-1 of the wireless power receiving device of FIG. 10 according to an example embodiment. The coil circuit 110-1 includes a first coil section L11, a second coil section L21, a first capacitor C11, and a second capacitor C21.

The first coil section L11 is an internal portion of one coil formed on one surface of a substrate. The second coil section L21 is an external portion of the one coil.

The first capacitor C11 and the second capacitor C21 are implemented by being embedded in the substrate, however, other configurations are possible.

An internal terminal of the first coil section L11 is connected to the third node N3. The third node N3 maintains a connection to the rectifying circuit (121 of FIG. 3).

An external terminal of the first coil section L11 and an internal terminal of the second coil section L21 is the same terminal, and is connected to the first capacitor C11 through a via between the same terminal and the first node N1. The first node N1 maintains a connection to the rectifying circuit (121 of FIG. 3).

An external terminal of the second coil section L21 may be connected to the second capacitor C21 through a via between the external terminal and the second node N2. The second node N2 may maintain a connection to the rectifying circuit (121 of FIG. 3).

Inductance of the second coil section L21 may be greater than inductance of the first coil section L11. To this end, at least one of a line width of the first coil section L11 and a line width of the second coil section L21, a material of a substrate of the first coil section L11 and a material of a substrate of the second coil section L21, a material of a magnetic substance or a molding substance that covers a top surface and/or a bottom surface of the first coil section L11, and a material of a magnetic substance or a molding substance that covers a top surface and/or a bottom surface of the second coil section L21 may be different.

In more detail, the line width of the second coil section L21 may be greater than the line width of the first coil section L11. Alternatively, a magnetic permeability of the substrate of the second coil section L21 may be greater than a magnetic permeability of the substrate of the first coil section L11. Alternatively, a magnetic permeability of the material of the magnetic substance or the molding substance that covers the top surface and/or the bottom surface of the second coil section L21 may be greater than a magnetic permeability of the material of the magnetic substance or the molding substance that covers the top surface and/or the bottom surface of the first coil section L11.

Figure 12:
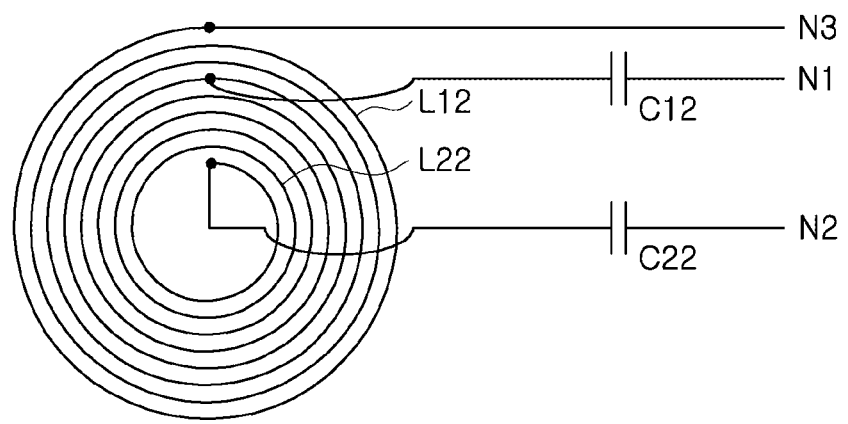
Figure 13:
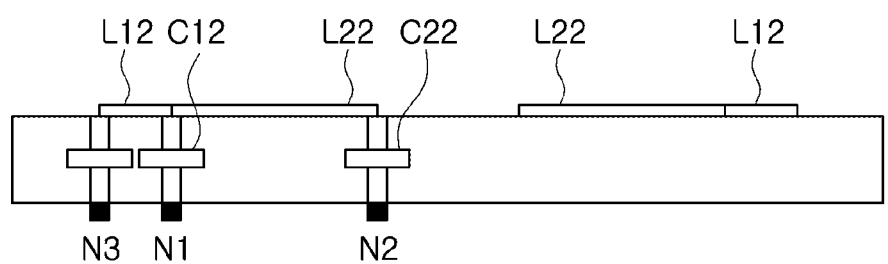

FIG. 12 is a diagram of a coil circuit 10-2 of a wireless power receiving device according to an example embodiment. FIG. 13 is a cross-sectional view of a coil circuit 110-2 of the wireless power receiving device of FIG. 12 according to an example embodiment. The coil circuit 110-2 may include a first coil section L12, a second coil section L22, a first capacitor C12, and a second capacitor C22.

The first coil section L12 may be an external portion of one coil formed on one surface of a substrate. The second coil section L22 may be an internal portion of the one coil.

The first capacitor C12 and the second capacitor C22 may be implemented by being embedded in the substrate.

An external terminal of the first coil section L12 may be connected to the third node N3. The third node N3 may maintain a connection to the rectifying circuit (121 of FIG. 3).

An internal terminal of the first coil section L12 and an external terminal of the second coil section L22 may be the same terminal, and may be connected to the first capacitor C12 through a via between the same terminal and the first node N1. The first node N1 may maintain a connection to the rectifying circuit (121 of FIG. 3).

An internal terminal of the second coil section L22 may be connected to the second capacitor C22 through a via between the internal terminal and the second node N2. The second node N2 may maintain a connection to the rectifying circuit (121 of FIG. 3).

Inductance, line widths, and materials of substrates of the first coil section L12 and the second coil section L22, and a material of a magnetic substance or a molding substance that covers a top surface and/or a bottom surface of the first coil section L12 or the second coil section L22 may be the same as described with reference to FIGS. 10 and 11 above.

Figure 14:
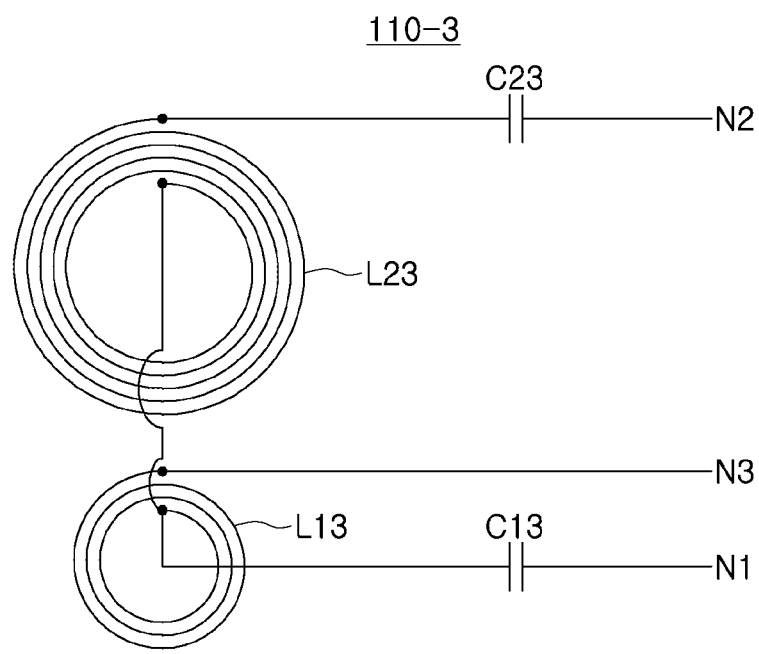
Figure 15:
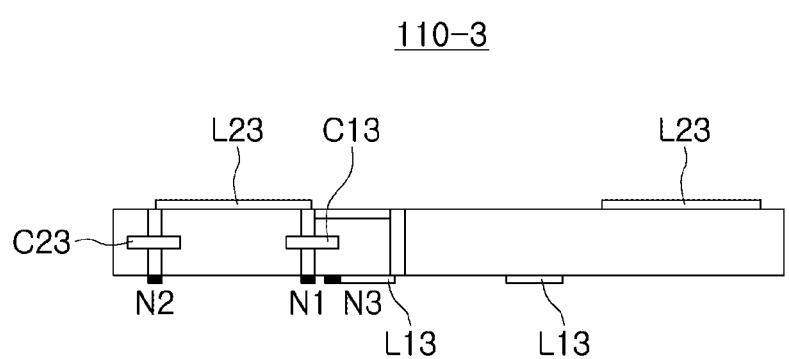

FIG. 14 is a diagram of a coil circuit 110-3 of a wireless power receiving device according to an example embodiment. FIG. 15 is a cross-sectional view of a coil circuit 110-3 of the wireless power receiving device of FIG. 14 according to an example embodiment. The coil circuit 110-3 includes a first coil section L13, a second coil section L23, a first capacitor C13, and a second capacitor C23.

The first coil section L13 includes one coil formed on a first surface of a substrate. The second coil section L23 includes one coil formed on a second surface of the substrate facing the first surface thereof.

The first capacitor C13 and the second capacitor C23 may be implemented by being embedded in the substrate.

An external terminal of the first coil section L13 is connected to the third node N3. The third node N3 maintains a connection to the rectifying circuit (121 of FIG. 3).

An internal terminal of the first coil section L13 and an internal terminal of the second coil section L23 are connected to each other through a via and a conductive wiring formed in the second surface of the substrate, and are connected to the first capacitor C13 through a via between the internal terminal of the second coil section L23 and the first node N1. The first node N1 may maintain a connection to the rectifying circuit (121 of FIG. 3).

An external terminal of the second coil section L23 may be connected to the second capacitor C23 through a via between the external terminal and the second node N2. The second node N2 may maintain a connection to the rectifying circuit (121 of FIG. 3).

Inductance, line widths, and materials of substrates of the first coil section L13 and the second coil section L23, and a material of a magnetic substance or a molding substance that covers a top surface and/or a bottom surface of the first coil section L13 or the second coil section L23 may be the same as described with reference to FIGS. 10 and 11 above.

Figure 16:
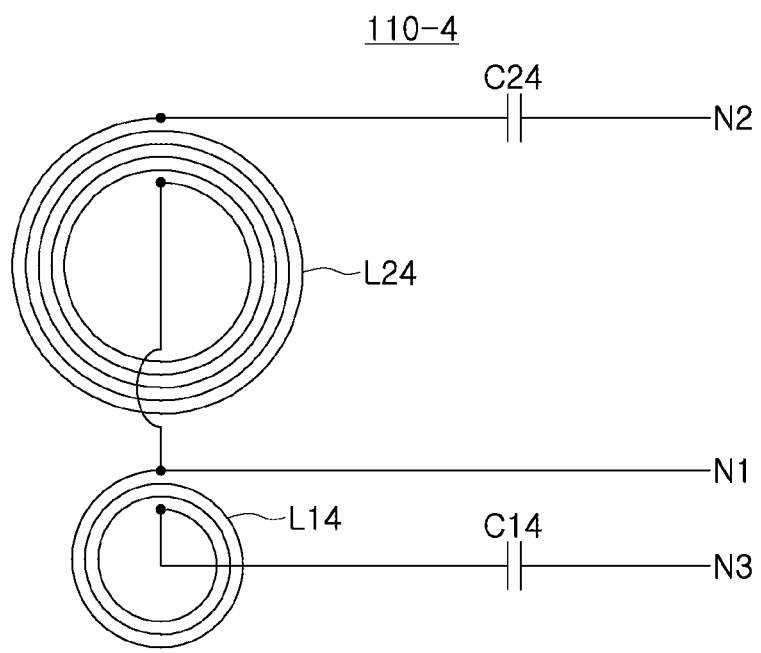
Figure 17:
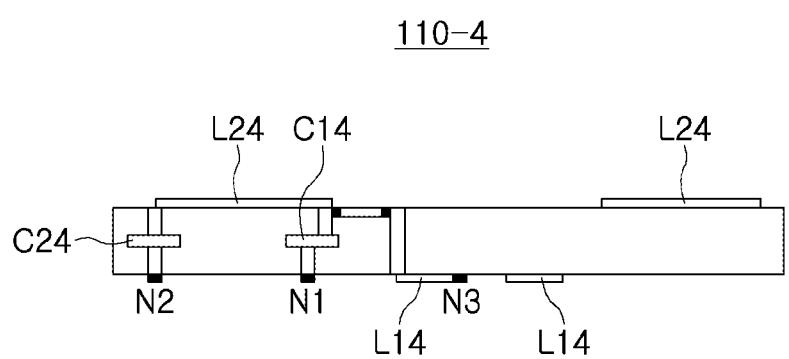

FIG. 16 is a diagram of a coil circuit 110-4 of a wireless power receiving device according to an example embodiment. FIG. 17 is a cross-sectional view of a coil circuit 110-4 of the wireless power receiving device of FIG. 16 according to an example embodiment. The coil circuit 110-4 includes a first coil section L14, a second coil section L24, a first capacitor C14, and a second capacitor C24.

The first coil section L14 includes one coil formed in a first surface of a substrate. The second coil section L24 includes one coil formed in a second surface of the substrate facing the first surface thereof.

The first capacitor C14 and the second capacitor C24 may be implemented by being embedded in the substrate.

An internal terminal of the first coil section L14 is connected to the third node N3. The third node N3 may maintain a connection to the rectifying circuit (121 of FIG. 3).

An external terminal of the first coil section L14 and an internal terminal of the second coil section L24 are connected to each other through a via and a conductive wiring formed in the second surface of the substrate, and are connected to the first capacitor C14 through a via between the internal terminal of the second coil section L24 and the first node N1. The first node N1 may maintain a connection to the rectifying circuit (121 of FIG. 3).

An external terminal of the second coil section L24 is connected to the second capacitor C24 through a via between the external terminal and the second node N2. The second node N2 may maintain a connection to the rectifying circuit (121 of FIG. 3).

Inductance, line widths, and materials of substrates of the first coil section L14 and the second coil section L24, and a material of a magnetic substance or a molding substance that covers a top surface and/or a bottom surface of the first coil section L14 or the second coil section L24 may be the same as described with reference to FIGS. 10 and 11 above.

Figure 18:
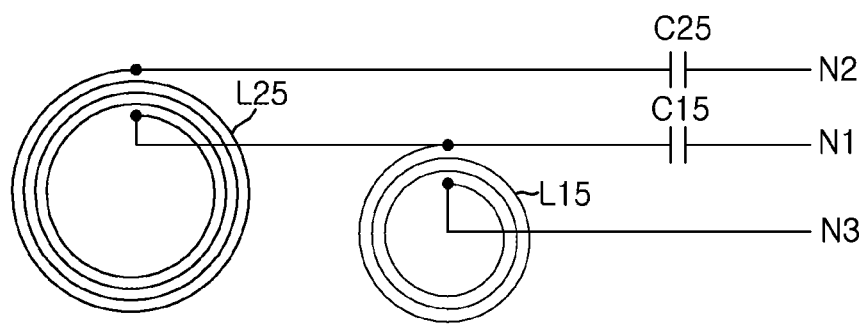
Figure 19:
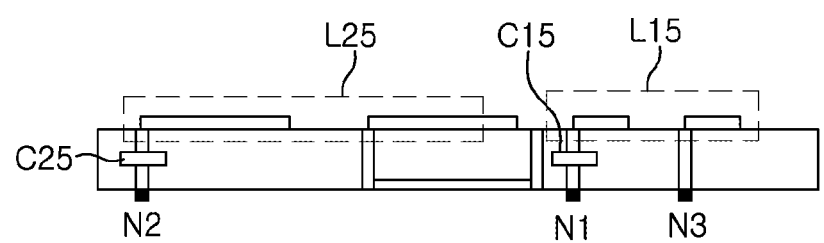

FIG. 18 is a diagram of a coil circuit 110-5 of a wireless power receiving device according to an example embodiment. FIG. 19 is a cross-sectional view of a coil circuit 110-5 of the wireless power receiving device of FIG. 18 according to an example embodiment. The coil circuit 110-5 includes a first coil section L15, a second coil section L25, a first capacitor C15, and a second capacitor C25.

The first coil section L15 may be one coil formed on a first surface of a substrate. The second coil section L25 may be one coil formed on the first surface of the substrate.

The first capacitor C15 and the second capacitor C25 may be implemented by being embedded in the substrate. Alternatively, or in addition, the capacitors may be formed as discrete electronic components residing on the substrate.

An internal terminal of the first coil section L15 may be connected to the third node N3. The third node N3 may maintain a connection to the rectifying circuit (121 of FIG. 3).

An external terminal of the first coil section L15 may be connected to an external terminal of the second coil section L25 through two vias and conductive wirings formed in the first surface of the substrate and a second surface of the substrate facing the first surface. The external terminal of the first coil section L15 may be connected to the first capacitor C15 through a via between the external terminal and the first node N1. The first node N1 may maintain a connection to the rectifying circuit (121 of FIG. 3).

An external terminal of the second coil section L25 is connected to the second capacitor C25 through a via between the external terminal and the second node N2. The second node N2 maintains a connection to the rectifying circuit (121 of FIG. 3).

Inductance, line widths, and materials of substrates of the first coil section L15 and the second coil section L25, and a material of a magnetic substance or a molding substance that covers a top surface and/or a bottom surface of the first coil section L15 or the second coil section L25 may be the same as described with reference to FIGS. 10 and 11 above.

Figure 20:
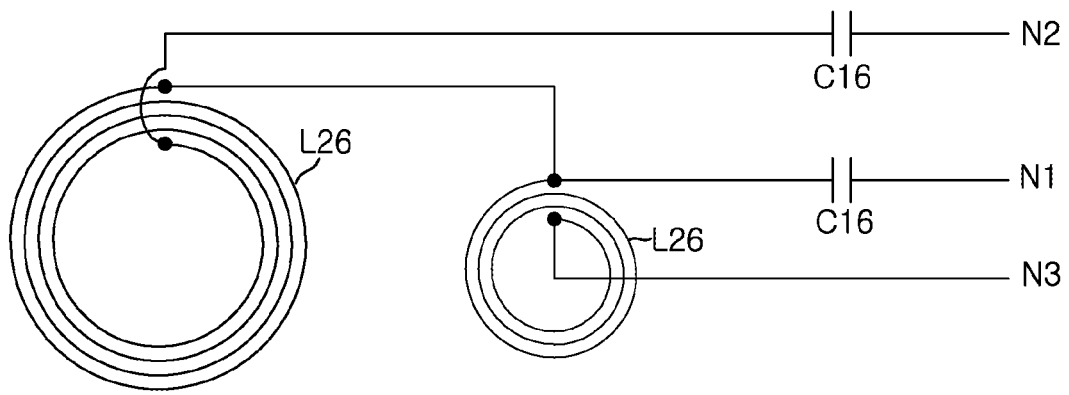
Figure 21:
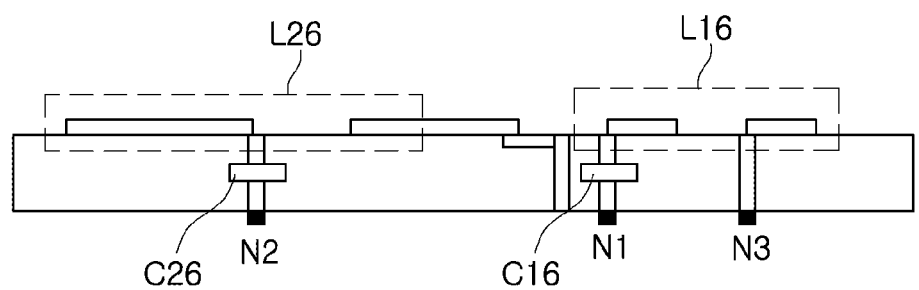

FIG. 20 is a diagram of a coil circuit 10-5 of a wireless power receiving device according to an example embodiment. FIG. 21 is a cross-sectional view of a coil circuit 110-6 of the wireless power receiving device of FIG. 20 according to an example embodiment. The coil circuit 110-6 may include a first coil section L16, a second coil section L26, a first capacitor C16, and a second capacitor C26.

The first coil section L16 may be one coil formed on a first surface of a substrate. The second coil section L26 may be one coil formed on the first surface of the substrate.

The first capacitor C16 and the second capacitor C26 may be implemented by being embedded in the substrate.

An internal terminal of the first coil section L16 may be connected to the third node N3. The third node N3 may maintain a connection to the rectifying circuit (121 of FIG. 3).

An external terminal of the first coil section L16 and an external terminal of the second coil section L26 may be connected through a conductive wiring formed on the first surface of the substrate. The external terminal of the first coil section L16 may be connected to the first capacitor C16 through a via between the external terminal and the first node N1. The first node N1 may maintain a connection to the rectifying circuit (121 of FIG. 3).

An internal terminal of the second coil section L26 may be connected to the second capacitor C26 through a via between the internal terminal and the second node N2. The second node N2 may maintain a connection to the rectifying circuit (121 of FIG. 3).

Inductance, line widths, and materials of substrates of the first coil section L16 and the second coil section L26, and a material of a magnetic substance or a molding substance that covers a top surface and/or a bottom surface of the first coil section L16 or the second coil section L26 may be the same as described with reference to FIGS. 10 and 11 above.

Each of the coil circuits of the wireless power receiving device according to an example embodiment described with reference to FIGS. 10 through 21 above may be implemented as one module. In an example embodiment described with reference to FIGS. 10 through 21 above, capacitors may be omitted in some configurations.

As a non-exhaustive example only, an apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/ personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device. In one example, a wearable apparatus is a device that is designed to be mountable directly on the body of the user, such as a pair of glasses or a bracelet. In another example, a wearable apparatus is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As set forth above, according to example embodiments, a wireless power receiving device, a coil module for the wireless power receiving device, and an apparatus including the wireless power receiving device may receive power having various frequencies by using one wireless charging receiving device without a switch and a complex control device for controlling the switch.

While example embodiments have been shown and described above, it will be apparent to those skilled in the art that modifications and variations could be made without departing from the scope in the present disclosure as defined by the appended claims.

What is claimed is:

1. A wireless power receiving device comprising:
a first resonance circuit comprising a first coil section and a first capacitor, and configured to have a first resonance frequency;
a second resonance circuit comprising the first coil section, a second coil section, and a second capacitor, and configured to have a second resonance frequency lower than the first resonance frequency; and
a rectifying circuit comprising,
    a first bridge connected to the first capacitor and the second capacitor without a switch,
    a second bridge connected to the first coil section without a switch, the second bridge configured to rectify power received through the first resonance circuit and the second resonance circuit, and
    a third capacitor connected in parallel to each of the first bridge, the second bridge, and a converter, the third capacitor configured to output wireless power rectified through the first bridge and the second bridge,
wherein the converter is a DC-DC converter,
wherein the first coil section includes a first coil on a first surface of a substrate, a first internal terminal connected to the first coil, and a first external terminal connected to the first coil and being on an outside relative to the first internal terminal in the first coil section,
wherein the second coil section includes a second coil on a second surface of the substrate facing the first surface of the substrate, a second internal terminal connected to the second coil and a second external terminal connected to the second coil and being on an outside relative to the second internal terminal in the second coil section, wherein the first capacitor is embedded in the substrate and connected to the second internal terminal and the first bridge through a first via, wherein the second capacitor is embedded in the substrate and connected to the second external terminal and the second bridge through a second via, wherein the first external terminal is connected to the second internal terminal through a third via, and wherein the first via, the second via and the third via are embedded in the substrate in parallel.

2. The wireless power receiving device of claim 1, wherein the first resonance frequency is more than 5 times the second resonance frequency, the first resonance frequency is $$\frac{1}{\sqrt{L1 \cdot C1}},$$

and the second resonance frequency is $$\frac{1}{\sqrt{(L1+L2) \cdot C2}},$$

where L1 is an inductance of the first coil section, L2 is an inductance of the second coil section, C1 is a capacitance of the first capacitor and C2 is a capacitance of the second capacitor.

3. The wireless power receiving device of claim 2, wherein a first inductance of the second coil section is more than 4 times a second inductance of the first coil section.

4. The wireless power receiving device of claim 3, wherein the capacitance of the second capacitor is more than 5 times the capacitance of the first capacitor.

5. The wireless power receiving device of claim 1, wherein the wireless power receiving device comprises one power receiving coil, the power receiving coil including a first part and a second part corresponding to the first coil section and the second coil section, respectively.

6. The wireless power receiving device of claim 5, wherein the first capacitor is connected between an intermediate node between the first part and the second part of the power receiving coil and the rectifying circuit, the second capacitor is connected between one end of the power receiving coil and the rectifying circuit, and the other end of the power receiving coil is connected to the rectifying circuit.

7. The wireless power receiving device of claim 1, wherein one end of the first coil and one end of the second coil are connected to each other, wherein the first capacitor is connected between the one end of the first coil and the rectifying circuit;

wherein the second capacitor is connected between the other end of the second coil and the rectifying circuit; and wherein the other end of the first coil is connected to the rectifying circuit.

8. An electronic apparatus comprising:

a wireless power receiving device comprising, a first resonance circuit comprising a first coil section and a first capacitor, and having a first resonance frequency, a second resonance circuit comprising the first coil section, a second coil section, and a second capacitor, and having a second resonance frequency lower than the first resonance frequency, a rectifying circuit configured to rectify power received through the first resonance circuit or the second resonance circuit, and output a charging power, the rectifying circuit comprising, a first bridge connected to the first capacitor and the second capacitor without a switch, a second bridge connected to the first coil section without a switch, and a third capacitor connected in parallel to each of the first bridge, the second bridge, and a converter, the third capacitor configured to output wireless power rectified through the first bridge and the second bridge; and a charger configured to be charged by the charging power received from the rectifying circuit, wherein the converter is a DC-DC converter, wherein the first coil section includes a first coil on a first surface of a substrate, a first internal terminal connected to the first coil, and a first external terminal connected to the first coil and being on an outside relative to the first internal terminal in the first coil section, wherein the second coil section includes a second coil on a second surface of the substrate facing the first surface of the substrate, a second internal terminal connected to the second coil and a second external terminal connected to the second coil and being on an outside relative to the second internal terminal in the second coil section, wherein the first capacitor is embedded in the substrate and connected to the second internal terminal and the first bridge through a first via, wherein the second capacitor is embedded in the substrate and connected to the second external terminal and the second bridge through a second via, wherein the first external terminal is connected to the second internal terminal through a third via, and wherein the first via, the second via and the third via are embedded to the substrate in parallel.

9. A wireless power receiving apparatus comprising:

a substrate;

a rectifier; and a receiving coil on the substrate, the receiving coil comprising, a shared coil portion comprising a first coil section and a first capacitor, and configured to have a first resonance frequency, and an extended coil portion comprising the first coil section, a second coil section, and a second capacitor, and configured collectively with the shared coil portion to have a second resonance frequency lower than the first resonance frequency, the shared coil portion and the extended coil portion being fixedly coupled to the rectifier for selective actuation according to a received wireless power, wherein the rectifier comprises, a first bridge connected to the first capacitor and the second capacitor without a switch, a second bridge connected to the first coil section without a switch, and a third capacitor connected in parallel to each of the first bridge, the second bridge, and a converter, and configured to output wireless power rectified through the first bridge and the second bridge, wherein the converter is a DC-DC converter, wherein the first coil section includes a first coil on a first surface of the substrate, a first internal terminal connected to the first coil, and a first external terminal connected to the first coil and being on an outside relative to the first internal terminal in the first coil section, the second coil section includes a second coil on a second substrate facing the first surface of the substrate, a second internal terminal connected to the second coil and a second external terminal connected to the second coil and being on an outside relative to the second internal terminal in the second coil section, wherein the first capacitor is embedded in the substrate and connected to the second internal terminal and the first bridge through a first via, wherein the second capacitor is embedded in the substrate and connected to the second external terminal and the second bridge through a second via, wherein the first external terminal is connected to the second internal terminal through a third via, and wherein the first via, the second via and the third via are embedded to the substrate in parallel.

10. The wireless power receiving apparatus of claim 9, wherein the extended coil portion is configured collectively with the shared coil portion to establish the second resonance frequency 4 times to 20 times lower than the first resonance frequency.

11. The wireless power receiving apparatus of claim 9, wherein the shared coil portion is configured to receive an Alliance For Wireless Power (A4WP) wireless charging standard.

12. The wireless power receiving apparatus of claim 11, wherein the extended coil portion is collectively configured with the shared coil portion to receive a Wireless Power Consortium (WPC) or a Power Matters Alliance (PMA) wireless power standard.

* * * * *